Figure 1:
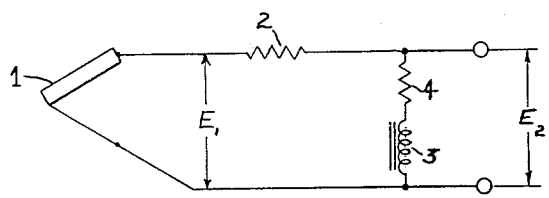

Oct. 30, 1951  F. F. OFFNER  2,573,596

TEMPERATURE RESPONSIVE SYSTEM

Filed March 8, 1948

Inventor
Franklin F. Offner.

By Pierce, Scheffler & Parker.
Attorneys.

Patented Oct. 30, 1951

2,573,596

UNITED STATES PATENT OFFICE 2,573,596

TEMPERATURE RESPONSIVE SYSTEM

Franklin F. Offner, Chicago, Ill.

Application March 8, 1948, Serial No. 13,546

2 Claims. (Cl. 73—359)

This invention relates to means for measurement and control of temperature, and more particularly as to means by which the response time of temperature pick-up elements can be effectively reduced through the use of electrical circuits.

For the measurement and control of temperatures, two types of pick-up elements have in the past been found most satisfactory: the thermocouple, consisting of two dissimilar wires, which produce an electromotive force in response to a temperature difference; and an electrical resistance thermometer, consisting of a wire of a single type, which changes its resistance in response to a temperature change. This resistance may be determined for example in a Wheatstone bridge circuit. Both types of elements may also be used for the determination of radiation. In this case, radiation receiving surfaces are attached to the elements. The first named type is then referred to as a "radiation thermocouple," or when a number of junctions are used, a "radiation thermopile"; and the second a "bolometer." The present invention applies to such applications of temperature measuring elements, as well as to the thermocouples and resistance thermometers when applied to other purposes.

In order to make temperature measuring elements of practical value, they must be made with wires of sufficient diameter to be mechanically strong enough for the application. For example, an important application of temperature measurement is in the measurement of gas temperatures in the tail pipe or combustion chambers of gas turbines. Because of the high velocity of high temperature gases in both places, it is necessary to use quite heavy wires of from .025 to .05 inch diameter. The use of such a heavy wire has, however, a serious disadvantage: it results in a considerable slowing of the response of the temperature measuring element. This is of especial importance in the measurement and control of gas temperatures in the gas turbine, since in this type of engine, temperatures may vary with great rapidity, and result in damage to the engine if they exceed a safe value. It thus becomes essential to reduce the response time of the temperature measuring element to the lowest practical value.

The primary object of this invention is to provide for such a reduction in the effective response of temperature pick-up elements and specifically by means of an electrical compensation circuit, without changing the pick-up element itself. In this way, it is possible to maintain the reliability resulting from the use of heavy wires in the element; and obtain the high response speed required for effective control purposes.

Several different types of compensation circuits are shown in the accompanying drawings.

Figure 2:
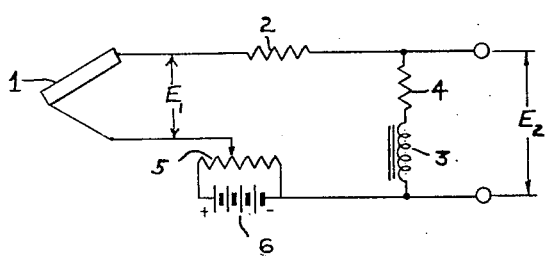
Figure 3:
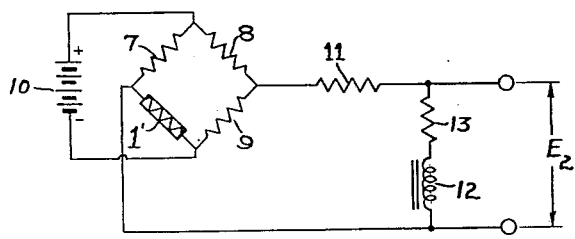
Figure 4:
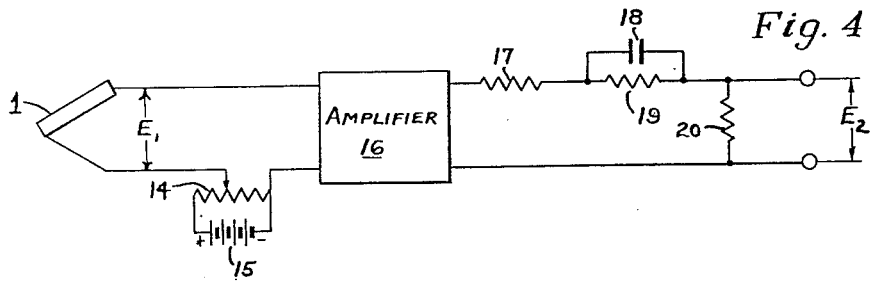

Figs. 1–3 are schematic circuit diagrams illustrating resistance-inductance types of compensators while Fig. 4 shows how a resistance-capacitor combination can be connected to bring about the desired result.

The simplest application of the present invention is illustrated in Fig. 1. Here, numeral 1 designates a thermocouple, and the voltage generated by it can be designated $E_1$. $R_1$ as used in the equation below, is comprised of the internal resistance of the thermocouple itself plus a series connected external resistance 2, if necessary, to bring the total to a desired value. In the normal application of thermocouples, the output voltage $E_2$ would be equal at all times to the thermocouple voltage $E_1$. It would rise and fall at the same rate as $E_1$ and be equal to it in magnitude.

In accordance with the form of the present invention shown in Fig. 1, however, a reactance compensation circuit consisting of an inductance-resistance combination in series is shunted across the output of the thermocouple. The compensation circuit includes a core type coil 3 having an inductance value L and a resistance of value $R_L$. The latter may consist solely of the internal resistance of coil 3 or, as shown, may include an extra resistor 4 if found necessary to bring $R_L$ up to the required value.

The behaviour of the complete circuit will be now shown by a mathematical analysis. Assume that the temperature difference across the thermocouple starts at some value T, and suddenly falls to zero. Then the thermocouple voltage starts at some initial value, $E_{10}$, and will decay towards zero in an essentially exponential manner. That is, $$E_1 = E_{10} e^{-t/k} \qquad (1)$$

where $t$ is the time following the sudden change in temperature; and $k$ is the "time constant" of the thermocouple. Thus, after time $k$, the voltage $E_1$ will have fallen to 37% of its original value. With heavy wires in the thermocouples, this time may be several seconds.

Consider now the effect of the addition of the inductance L, with the internal and external resistance $R_L$. The solution of the differential equation for the circuit according to standard methods results in the following expression:

$$E_2 = \frac{E_{10}}{Rk-L}(R_Lk-L)e^{-t/k} + \frac{R_1L}{R}e^{-Rt/L} \quad (2)$$

where $$R = R_1 + R_L$$

It is thus seen that the effective output voltage $E_2$, is given by the sum of two exponentials. The first has a time constant equal to that of the thermocouple; while the second has a time constant given only by the electrical circuit. Thus, if the coefficient of the first term is made equal to zero, the time constant of the output voltage will be independent of the time constant of the thermocouple. This term is equal to zero when $$\frac{\cdot L}{R_L} = k$$

that is, when the time constant of the inductive branch is matched, i. e. made equal, to the time constant of the thermocouple. The effective time constant is then only given by the second term. It is the time constant of the whole circuit; that is, it is $L/R = L/(R_1+R_L)$. At the same time, the output voltage is reduced by a constant factor, $$\frac{L/R}{k}$$

That is, in the ratio of the effective time constant to the original time constant of the thermocouple.

To be strictly accurate, the above circuit must be used with a voltage measuring device, to indicate $E_2$, which draws inappreciable current from the circuit. This may for example be a vacuum tube voltmeter; or a high resistance indicating type instrument.

Also, to be strictly accurate, the time constant of the inductive branch must exactly match the time constant of the thermocouple. Such a matching may be accomplished where there is no gas velocity past the thermocouple. Such a case occurs in a radiation measuring thermocouple, which is totally enclosed. A variable gas velocity past the thermocouple will cause the time constant of the thermocouple to be variable. However, when the gas velocity exceeds a limiting value of approximately 400 feet per second, the effective time constant of the thermocouple again stabilizes at an almost constant value. Fortunately, velocities in excess of this are usually encountered in gas turbine work, so that a satisfactory degree of constancy is maintained in this application. Furthermore, in control or measurement work where it is not desired to record the exact wave form of the temperature change, it is not necessary that a perfect balance be maintained at all times. In fact, additional stability may be obtainable by slightly over-compensating so that first term in Equation 2 above actually is negative. This results in a slight "overshoot" of $E_2$. This may be used to counteract other delays in the system.

In the circuit shown in Figure 1, any variation in the resistance of the thermocouple, as may occur due to erosion, would result in an erroneous value of $E_2$. For control purposes, it is therefore preferable to place the balancing voltage within this network, so that $E_2$ only gives the difference between the thermocouple voltage and the desired balancing voltage. This is shown in Figure 2. Here, the balancing voltage is given from voltage divider 5, across battery 6. Now, $R_1$ represents the resistance of the thermocouple plus the in-circuit resistance of the voltage divider 5, and any additional external resistance 2 required. As applied to gas turbine control work, the voltage across 5 could be adjusted to the desired temperature at which the engine is to operate, or to which the temperature is to be limited. Then the output voltage $E_2$ would be proportional to the deviation from this temperature. In the event that the resistance of the thermocouple were to change, the balance point would not be affected, but only the voltage proportional to the deviation from balance. In other words, the temperature datum would not be affected, but only the sensitivity of the system.

A circuit analogous to Figure 2 may be employed with resistance type temperature measuring elements. This is illustrated in Figure 3. Here 1' is the temperature variant resistance element. 7, 8 and 9 are balancing arms of a Wheatstone bridge, which is energized from battery 10. 11 represents the effective output resistance of the bridge, plus any additional resistance which may be required to obtain the desired time constant. The output of the bridge is shunted by core type coil 12 of inductance value L, and $R_L$ represents the internal resistance of coil 12 plus external resistance 13, as before. The theory of this circuit is identical with that of the thermocouple given above, except that the effective bridge resistance is not precisely constant, since the effect of changing temperature is a change of resistance of element 1'. However, this is a small fraction of the total resistance, and in any case merely results in a slight variation in the effective time constant of the circuit.

The essential feature of the reactance compensating circuit is that it shall have a differential equation for output voltage similar to that describing the action of the circuit of Figure 1. A differential equation identical in form is obtained from the resistance-capacitor compensating circuit as shown in Figure 4. Furthermore, it is not necessary to compensate the temperature measuring element directly. If desired, the voltage may first be amplified, as, for example, in a direct current vacuum tube amplifier. A suitable circuit is shown in Figure 4. Here, the temperature pick-up element is shown as a thermocouple 1. It is balanced through voltage divider arrangement 14, operating with battery 15, as before in Figure 2. The output voltage is amplified by vacuum tube amplifier 16, the details of which are not shown. Any of the numerous circuits well known to the art may be employed, although a particularly suitable one is illustrated in applicant's application No. 770,872, filed August 27, 1947.

In the output circuit, 17 represents the effective output resistance ($R_A$) of amplifier 10. In series with the output is placed condenser 18 of capacitance value C, and resistor 19 of resistance value $R_c$, connected in parallel. Across the output is then placed load resistor 20 of resistance value $R_D$, and the output voltage $E_2$ is taken across this resistor.

This circuit may be analyzed in an analogous manner to the analysis of the circuit of Figure 1. The results are exactly parallel, and it is found that the time constant of rise or fall of $E_2$ is independent of the time constant of the thermocouple when $k=R_cC$. The effective time constant of the circuit becomes $$k_1 = \frac{R_c(R_0+R_A)C}{R_c+R_0+R_A}$$

where $k_1$ is the effective time constant.

In Figure 4, a condenser is shown in combination with resistors for compensating the temperature measuring element, in connection with an amplifier. In the previous circuits, an inductance had been shown in connection with resistors, in compensating the unamplified voltage. This is done only for the sake of convenience, since an inductance is more practical in combination with low resistor values, and condensers in connection with high values of resistance. If it were desirable, the circuit of Figure 4 could of course be used with the unamplified voltage; and the circuit of Figure 1 with amplified voltage. However, the figures illustrate the more practical embodiments of the invention.

No illustration is given of the use to be made of the output voltage, $E_2$. This may be used for a variety of purposes, such as recording of temperature, or control or limiting of temperature.

In conclusion, I desire it to be understood that while in accordance with the patent statutes, I have illustrated and described typical circuit arrangements by which the desirable compensation for thermal lag can be obtained, it will be evident that modifications thereof may be provided without departing from the spirit and scope of the invention as defined in the appended claims.

I claim:

1. In a system incorporating a temperature sensitive element responding exponentially with time such as a thermocouple, resistor and the like, and which element exhibits a thermal lag reflected by a corresponding lag in a voltage output derived therefrom, a compensating circuit for reducing said lag, said circuit comprising a condenser and resistance combination in parallel and a second resistance in series with said combination and which with the latter is shunted across said output, the final output being taken across said second resistance, and said circuit exhibiting an exponential response to a suddenly applied voltage, the time constant of such response being so matched to the time constant of said temperature sensitive element as to render the effective time constant of the combination of said element and circuit shorter than the time constant of said element.

2. In a system incorporating a temperature sensitive element responding exponentially with time such as a thermocouple, resistor and the like, and which element exhibits a thermal lag reflected by a corresponding lag in a voltage output derived therefrom, means for amplifying said voltage output, and a compensating circuit for reducing said lag, said circuit comprising a condenser and resistance combination in parallel and a second resistance in series with said combination and which with the latter is shunted across the output of said amplifier means, the final output being taken across said second resistance, and said circuit exhibiting an exponential response to a suddenly applied voltage, the time constant of such response being so matched to the time constant of said element as to render the effective time constant of the combination of said element and circuit shorter than the time constant of said element.

FRANKLIN F. OFFNER.

REFERENCES CITED

The following references are of record in the file of this patent:

UNITED STATES PATENTS

| Number | Name | Date |
| --- | --- | --- |
| 2,021,752 | Suits | Nov. 19, 1935 |
| 2,172,961 | Merz | Sept. 12, 1939 |
| 2,340,126 | Jones | Jan. 25, 1944 |
| 2,356,617 | Rich | Aug. 22, 1944 |
| 2,363,057 | Gaylord | Nov. 21, 1944 |